(12) United States Patent
Yoshida

(10) Patent No.: US 6,721,498 B2
(45) Date of Patent: Apr. 13, 2004

(54) DISTANCE MEASURING APPARATUS AND CAMERA COMPRISING THE APPARATUS

(75) Inventor: Hideo Yoshida, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 10/607,522

(22) Filed: Jun. 27, 2003

(65) Prior Publication Data

US 2004/0013421 A1 Jan. 22, 2004

(30) Foreign Application Priority Data

Jul. 5, 2002 (JP) .................................. 2002-197523

(51) Int. Cl.⁷ .............................. G03B 13/36; G01C 3/08
(52) U.S. Cl. ................................... 396/123; 356/3.14
(58) Field of Search .................. 396/121–123; 356/3.14

(56) References Cited

U.S. PATENT DOCUMENTS

| | | | | |
|---|---|---|---|---|
| 4,827,303 A | * | 5/1989 | Tsuboi | 396/123 |
| 4,943,824 A | * | 7/1990 | Nabeshima et al. | 396/50 |
| 5,258,801 A | * | 11/1993 | Kusaka et al. | 396/123 |
| 5,410,383 A | * | 4/1995 | Kusaka et al. | 396/102 |
| 5,552,853 A | | 9/1996 | Muramatsu et al. | |
| 2003/0164935 A1 | * | 9/2003 | Kanemitsu | 356/3.14 |

FOREIGN PATENT DOCUMENTS

JP           05-188276           7/1993

* cited by examiner

*Primary Examiner*—W. B. Perkey
(74) *Attorney, Agent, or Firm*—Leydig, Voit & Mayer, Ltd.

(57) ABSTRACT

A distance measuring apparatus detects the shortest distance measurement value corresponding to the shortest distance among multiple distance measurements, and selects distance measurement values which differ from the shortest distance measurement value by a value less than a threshold value; calculates a first correction value as a mean of differences between the shortest distance measurement value and the distance measurement values selected; detecting the longest distance measurement value corresponding to the longest distance among the distance measurement values selected, and calculates a second correction value as ½ of the difference between the shortest distance measurement value and the longest distance measurement value; and calculates autofocus data by correcting the shortest distance measurement value, adopting a correction value that is the lesser of the first correction value and the second correction value.

3 Claims, 12 Drawing Sheets

DISTANCE MEASURING APPARATUS AND CAMERA COMPRISING THE APPARATUS

BACKGROUND OF THE INVENTION

1. Field of the Invention

The present invention relates to a distance measuring apparatus and a camera comprising the same.

2. Description of the Related Art

In a distance measuring apparatus (a passive autofocusing (AF) system distance measuring apparatus, for example) that is capable of obtaining a plurality of distance measurement values, and that determines autofocus data (a parameter for adjusting a plane to be brought into focus by autofocus means) based on the plurality of distance measurement values obtained, it is common to use the shortest distance data selected among a plurality of obtained distance measurement values as the autofocus data without further processing, or to set the mean value of the distance measurement values as the autofocus data. The distance measuring apparatus of the camera disclosed in Japanese Patent Application Laid-open No. 5-188276, for example, switches between using the mean value of the distance measurement values, and using the shortest distance depending on the magnitude of the shortest distance in comparison with a predetermined threshold value.

However, according to the above-mentioned distance measuring apparatus, because the decision between using shortest distance data and mean value is made based on the magnitude of the shortest distance and the predetermined threshold value, following inconveniences occur, for example.

Figure 11:
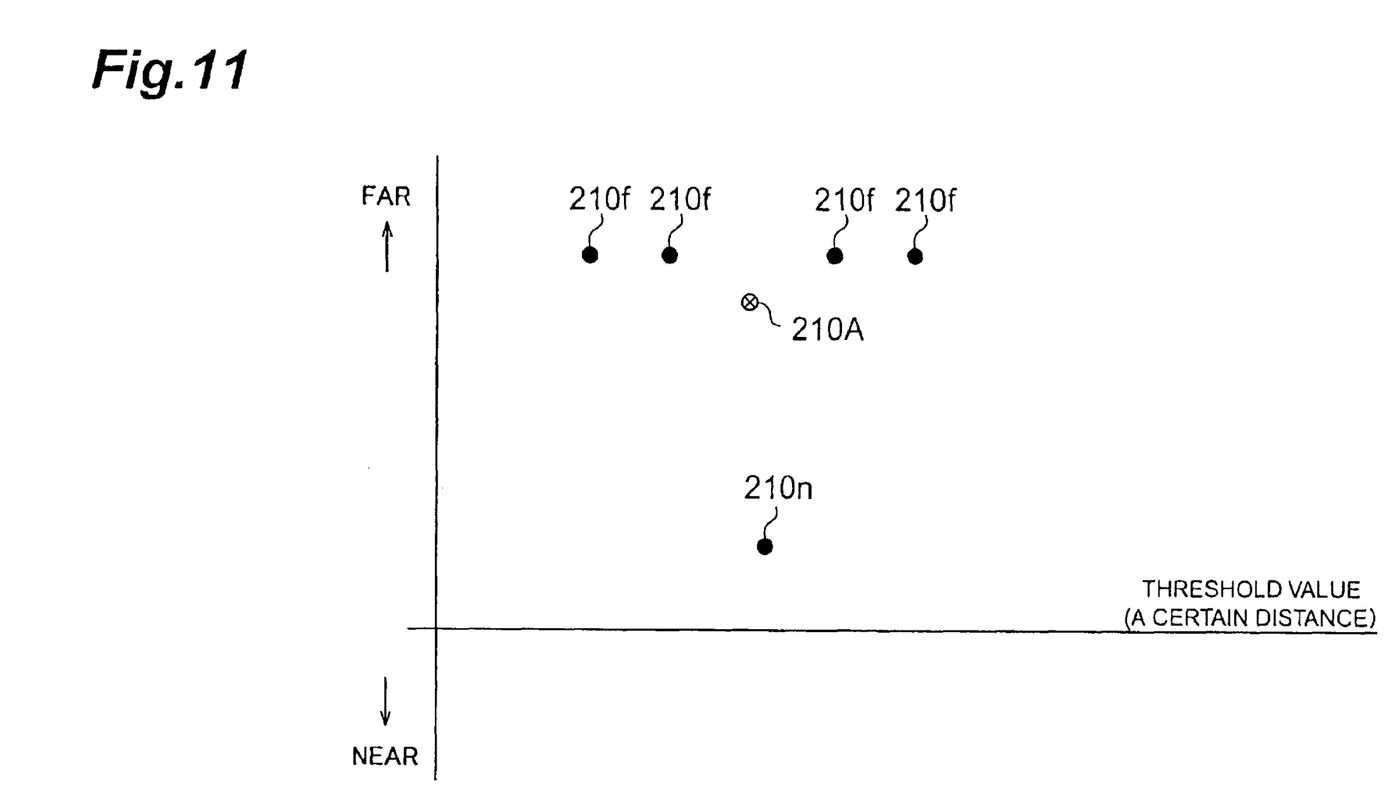
FIG. 11 is a schematic view depicting the positional relationships of the distance measurement values of the prior art.

When many distance measurement values 210$f$ (background and the like) corresponding to greater distances are included as in FIG. 11, in case where the distance measurement value 210$n$ (people and the like) of a short distance is farther than the predetermined threshold distance, the mean distance 210A (farther away from people and the like) is chosen, thereby increasing the deviation from the true distance (people and the like).

Figure 12:
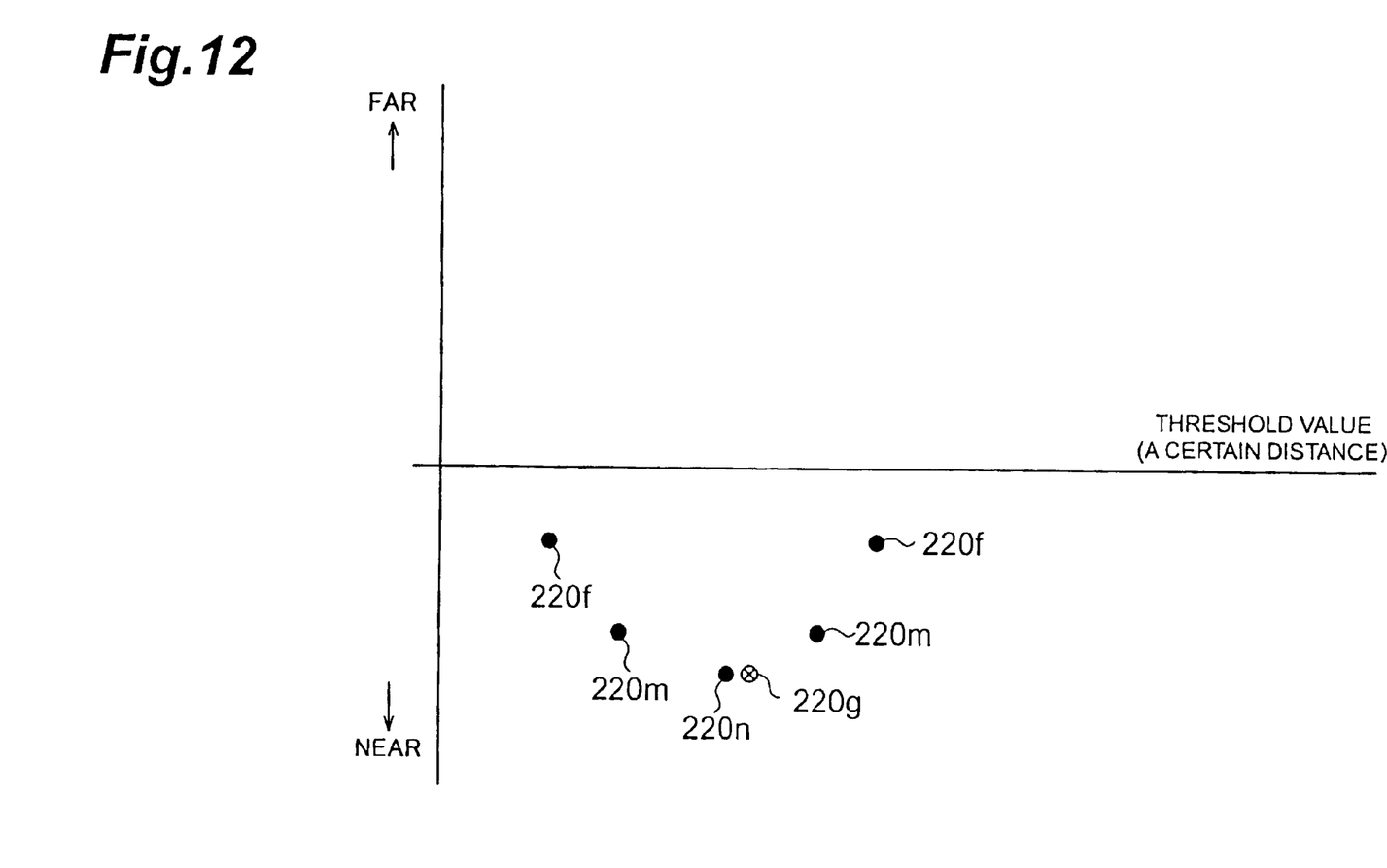
FIG. 12 is a schematic view depicting the positional relationships of the distance measurement values of the prior art.

On the other hand, it is not possible to appropriately calculate the autofocus data so as to photograph with good results close-up shots of the faces of people, or other objects such as flowers that have disparate positions at short distance. Specifically, when close-up shots of the faces of people are made at a short distance as in FIG. 12, the focus matches the nose position 220$g$ at a short distance, thus although the nose 220$n$ is accurately focused, the ears 220$f$ become a blur.

SUMMARY OF THE INVENTION

In view of the above, it is an object of the present invention to solve the above-stated problems and to provide a distance measuring apparatus capable of calculating autofocus data so that an excellent focal point can be obtained based on a plurality of distance measuring data, and to provide a camera comprising the same.

To solve the above-stated problems, the distance measuring apparatus of the present invention has a plurality of distance measuring regions and calculates autofocus data on the basis of a plurality of distance measurement values acquired in the plurality of distance measuring regions, the distance measuring apparatus comprising: distance measurement value selecting means for detecting the shortest distance measurement value corresponding to the shortest distance among the plurality of distance measurement values, and selecting the distance measurement values which differ from the shortest distance measurement value by a value less than a predetermined threshold value; first computing means for calculating a first correction value, which is the mean value of the difference values between the shortest distance measurement value and the selected distance measurement values; second computing means for detecting the farthest distance measurement value corresponding to the farthest distance among the selected distance measurement values, and calculating a second correction value, which is ½ the difference between the shortest distance measurement value and the farthest distance measurement value; and third computing means for calculating the autofocus data by correcting the shortest distance measurement value, using the first correction value as the adopted correction value if the second correction value is greater than the first correction value, and the second correction value as the adopted correction value if the second correction value is less than the first correction value.

According to the distance measuring apparatus of the present invention, processing is performed as described below without simply adopting the shortest distance measurement value, or simply adopting the mean value of the distance measurement values, or switching between the mean value of the distance measurement values and the shortest distance measurement value on the basis of the results of the shortest distance measuring distance.

Specifically, distance measurement values within a predetermined range from the shortest distance are selected and, based on whether points of the selected distance measurement values are (1) biased to the nearest side or (2) biased to the farthest side in the predetermined range from the shortest distance, either (1) the mean value of the difference of the selected distance measurement values from the shortest distance measurement value, or (2) ½ of the difference between the shortest distance measurement value and the farthest distance measurement value among the selected distance measurement values is chosen as the adopted correction value, and the shortest distance measurement value is corrected by means of the adopted correction value toward the far side to calculate autofocus data. Therefore, autofocus data can be calculated in an appropriate manner without the autofocus data being excessively corrected on the basis of the shortest distance measurement value, or being set to the shortest distance when correction is required.

The above-stated predetermined range, when expressed as a distance measurement value (substantially equivalent to the inverse of the distance 1/L), is substantially the same value irrespective of the results for the shortest distance, however, when expressed as a distance value (unit: meter), the range differs depending on the results for the shortest distance in which the distance value of the predetermined range decreases as the shortest distance comes nearer, and the distance value of the predetermined range increases as the shortest distance moves farther away. This is because the distance measurement value has a substantially proportional relationship with the inverse of the distance.

Preferably, the predetermined threshold value of the distance measuring apparatus of the present invention is variable.

The camera of the present invention comprises the distance measuring apparatus described above, wherein the predetermined threshold value varies based on a circle of confusion.

According to the camera of the present invention, because only distance measurement values in which the circles of confusion (when the plane to be brought into focus is set at the shortest distance) are used in the calculation of the autofocus data, all of the selected distance measurement values would be within the acceptable range of the circle of confusion even when the autofocus data is to be maximally corrected. Thus, it is possible to set the desired plane to be brought into focus such that the circles of confusion formed by both the shortest point and the farthest point are within favorable range.

DESCRIPTION OF THE PREFERRED EMBODIMENTS

The distance measuring apparatus of the present invention is described in detail below with regard to the preferred embodiments when applied, to a camera in accordance with the accompanying diagrams.

Figure 1:
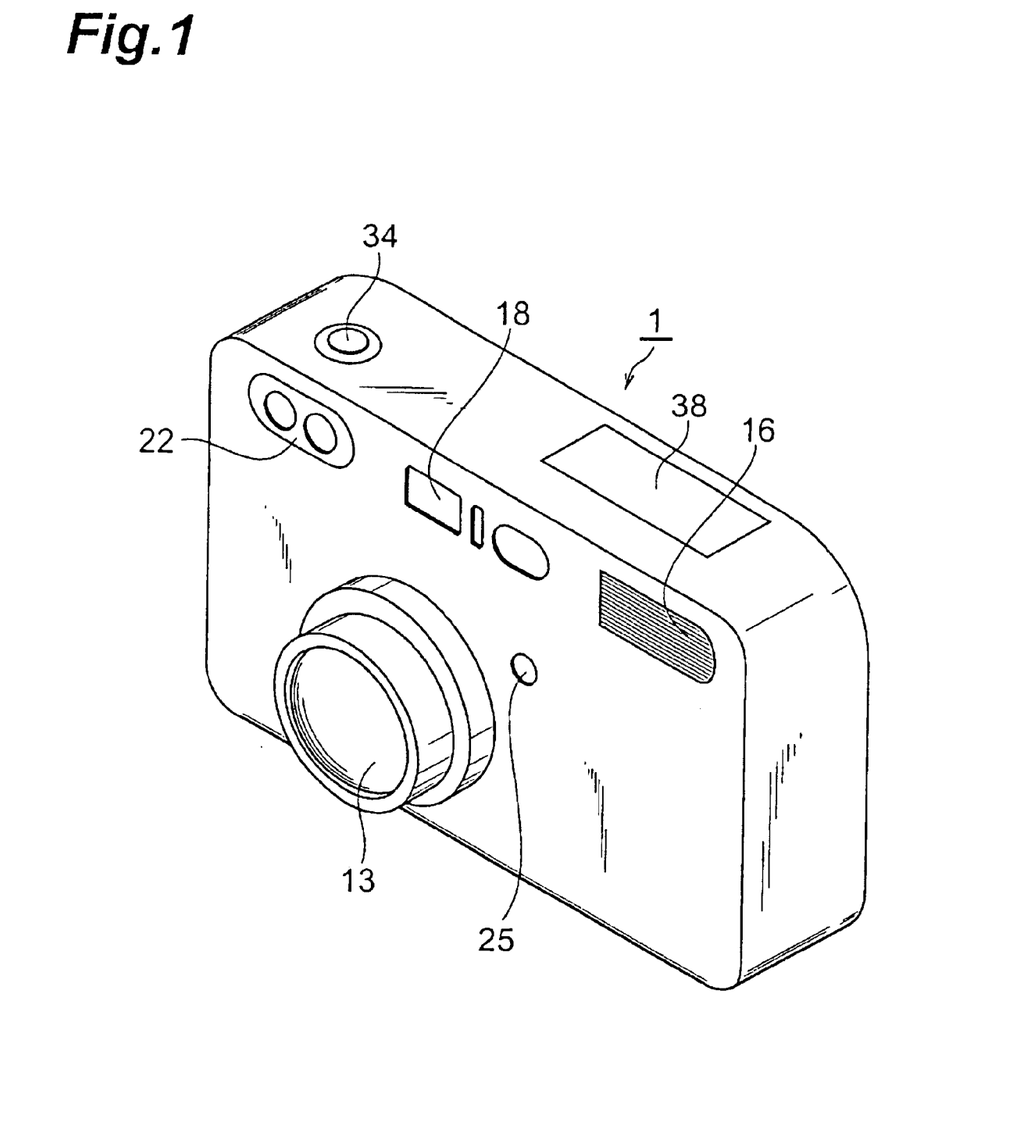
FIG. 1 is a perspective view of the front of the camera in which the present invention has been applied.

FIG. 1 is a perspective front view of the camera in which the present invention has been applied. The camera 1 comprises a zoom lens camera cone 13 with a photographic lens for imaging a subject image on silver bromide film, a strobe light emitting window 16 for emitting a stroboscopic light, a finder window 18 that allows the photographer to verify the subject, an AF window 22 wherein a passive AF sensor is mounted for measuring the distance to the subject, a photometric window 25 wherein a photometric sensor is mounted for measuring the brightness of the subject, a shutter button 34 that is operated when the photographer directs the shutter lens, and other components, as shown in the diagram.

Figure 2:
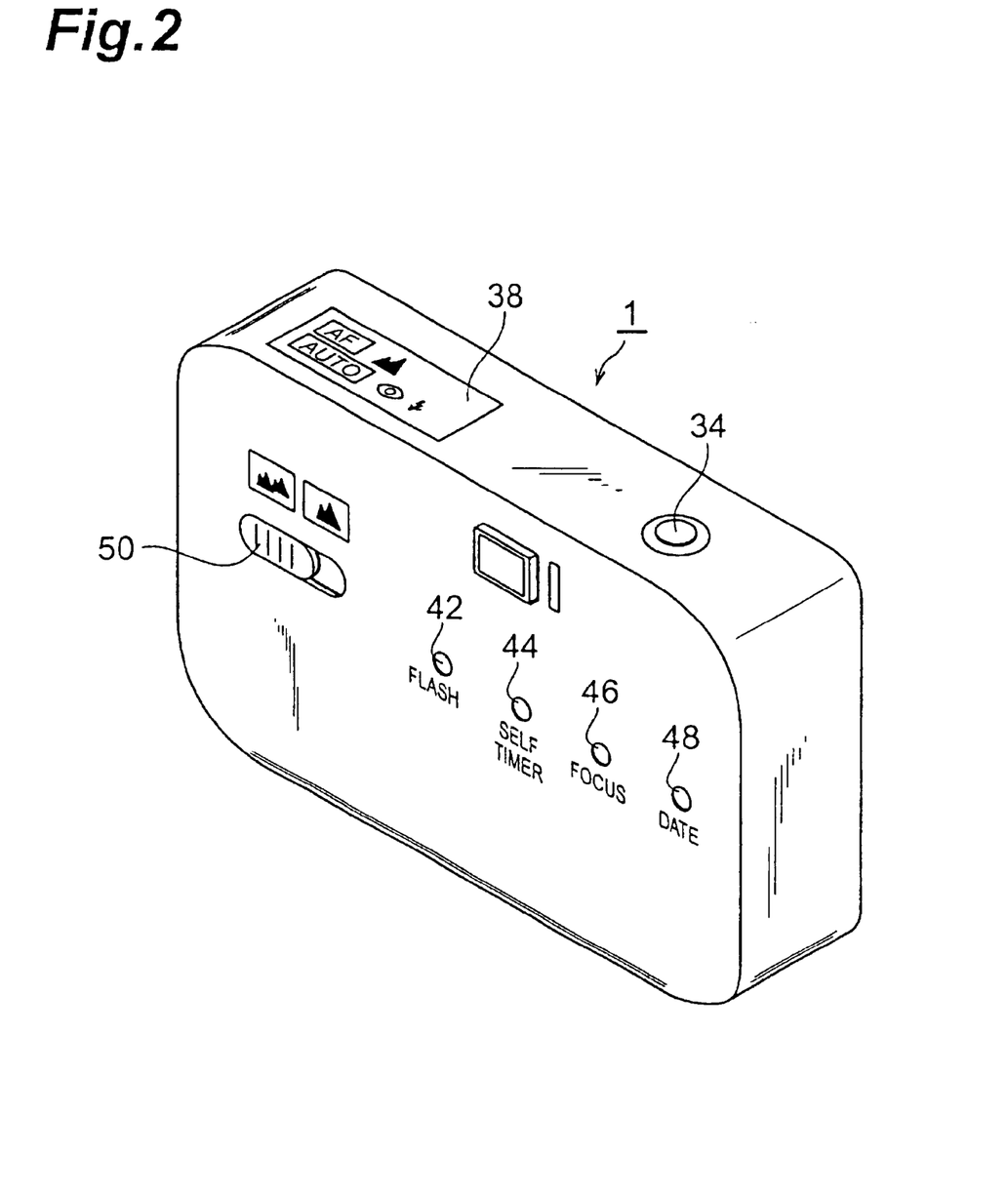
FIG. 2 is a perspective view of the back of the camera in which the present invention has been applied.

FIG. 2 is a perspective rear view of the camera 1. The camera 1 comprises an LCD display panel 38 for displaying photographic modes that have been set, date information, and the like; a flash button 42 for setting the light emitting mode of the strobe; a self timer button 44 for setting the mode of the self timer; a focus button 46 for setting the mode of the focus; a date button 48 for setting the date and time; and a zoom button 50 for directing the photographic angle of view in the wide direction or the telescopic direction, as shown in the diagram.

Figure 3:
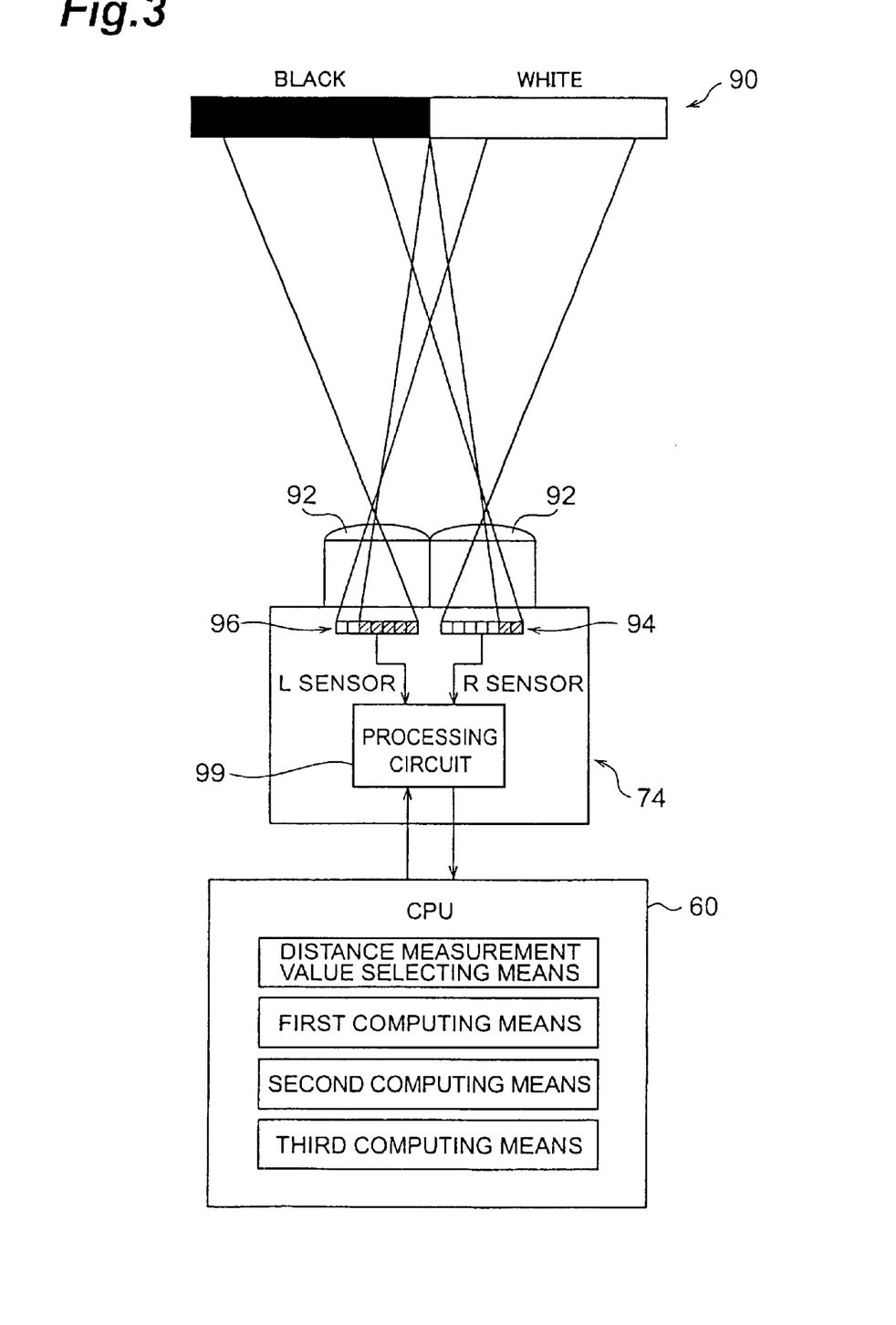
FIG. 3 is a diagram showing the structure of a passive AF sensor.

FIG. 3 is a diagram showing the structure of a passive AF sensor 74. The AF sensor 74 comprises lenses 92 for creating an image of the subject 90 that comprises the two colors white and black, for example, on the light-receiving surfaces of the left and right sensors; a right side R (right) sensor 94 and a left side L (left) sensor 96 for photoelectrically converting the image created on the light-receiving surfaces, and outputting the result as a luminance signal; and a processing circuit 99 for processing data and controlling the R sensor 94 and L sensor 96 together with transmitting and receiving a variety of data between the CPU 60, as shown in the diagram. The R sensor 94, L sensor 96, and processing circuit 99 are integrated on a substrate.

The R sensor 94 and L sensor 96 are CMOS line sensors, for example, and comprise a plurality of cells (photodetectors) arranged in a straight line. Sensor numbers 1, 2, 3, . . . , 233, and 234 are assigned in order from the left side of the diagram to the respective cells of the R sensor 94 and L sensor 96. However, because five cells each on both the left and right sides of the R sensor 94 and L sensor 96 are dummy cells and are not actually used, the effective sensor region is from sensor number 6 to 229. Luminance signals corresponding to the quantity of light received by the cells of the R sensor 94 and L sensor 96 are associated with sensor numbers and sequentially outputted to the processing circuit 99.

Computation of the correlative values between the respective sensor images of the R sensor 94 and L sensor 96 is performed in the CPU 60, the quantity of deviation of the sensor images when the correlation is at its greatest is obtained, and the distance to the subject 90 is calculated based on the quantity of deviation (the principle of triangulation).

Considering the distance to the lens 92 from the sensors, the space between the R sensor 94 and L sensor 96, the pitch of the cells in the R sensor 94 and L sensor 96 (12 $\mu$m, for example), and other factors, the distance to the subject can be quantitatively calculated from the quantity of deviation of the sensor images. The quantity of deviation of the sensor images can be obtained by computing the correlative values between the respective sensor images of the R sensor 94 and L sensor 96.

Figure 4A:
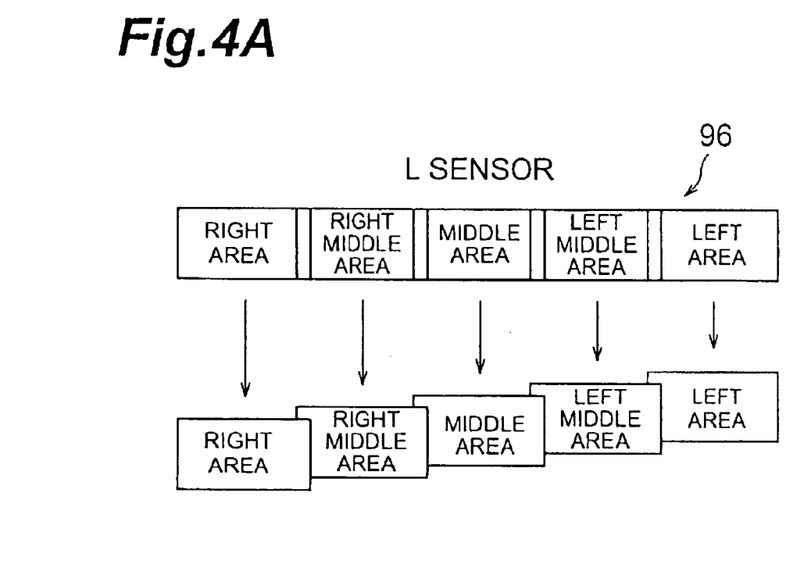
FIGS. 4A and 4B are diagrams showing the divided areas in the sensor regions of the R sensor and L sensor, respectively.
Figure 4B:
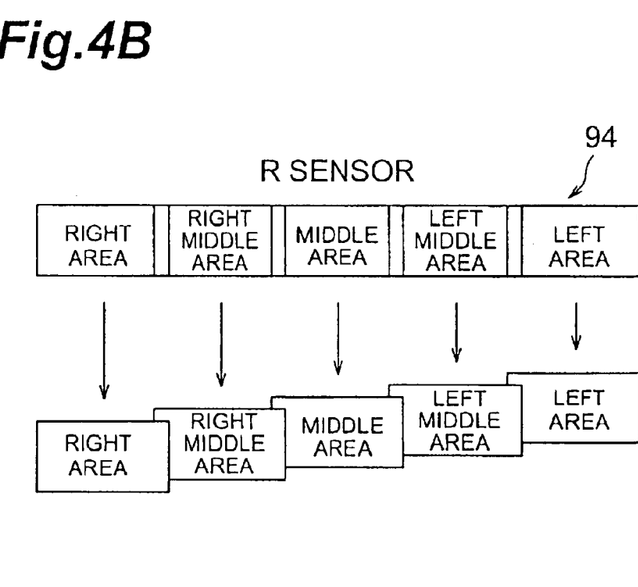

The sensor regions of the R sensor 94 and L sensor 96 are each divided into five sections (area units), and the computation of correlative values and other processing is performed for each area unit. Thus, the distance to the subject is calculated for each area, as shown in FIG. 4. Referring to these divided areas as division areas hereinafter, the division areas comprise a "right area," a "right middle area," a "middle area," a "left middle area," and a "left area" as shown in the same diagram. Each division area shares a portion of the region (cells) with neighboring division areas. The computation of correlative values is performed between each division area in the R sensor 94 and the corresponding division area in the L sensor 96. In the present embodiment, each sensor region is divided into five division areas, but the number of divisions may be a number other than five.

As long as an error does not occur during AF distance measurement processing, five distance measurement values (the distance to the subject) are therefore calculated from the above-mentioned respective areas. After the distance measurement values have been calculated, the CPU 60 performs the processing described below, and calculates the autofocus data on the basis of the distance measurement values.

Figure 5:
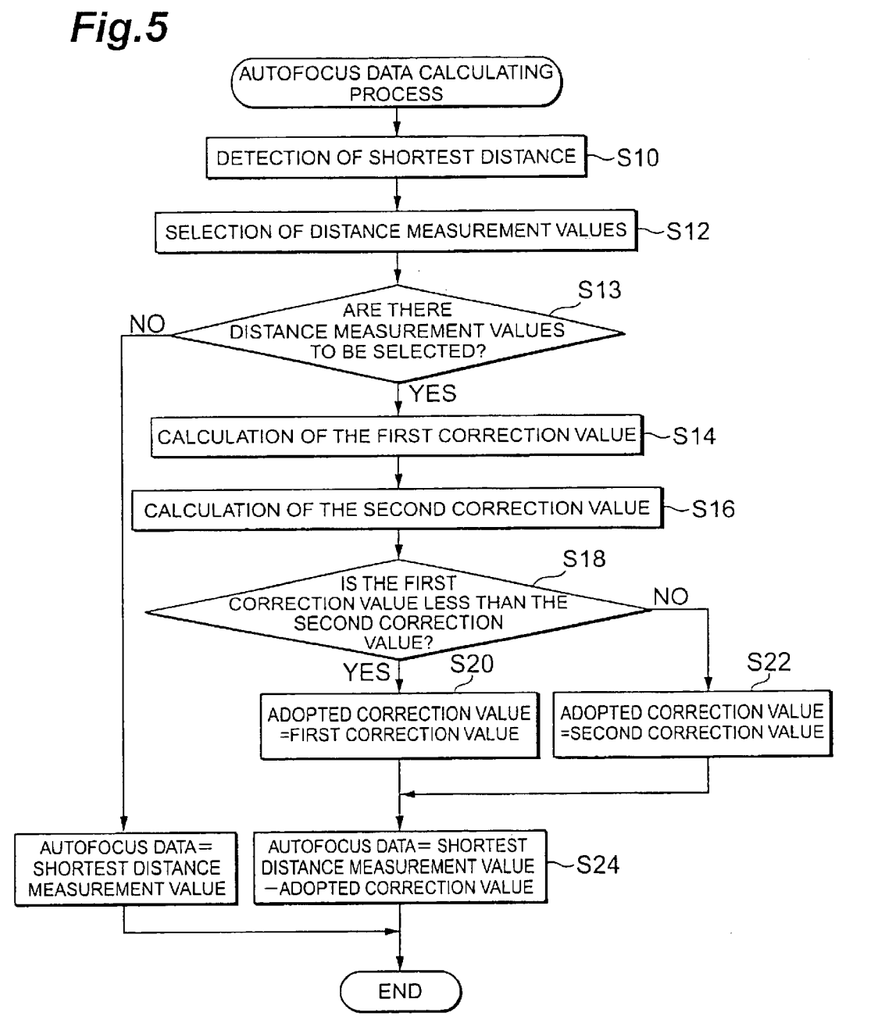
FIG. 5 is a flow chart of the process for calculating autofocus data.
Figure 6:
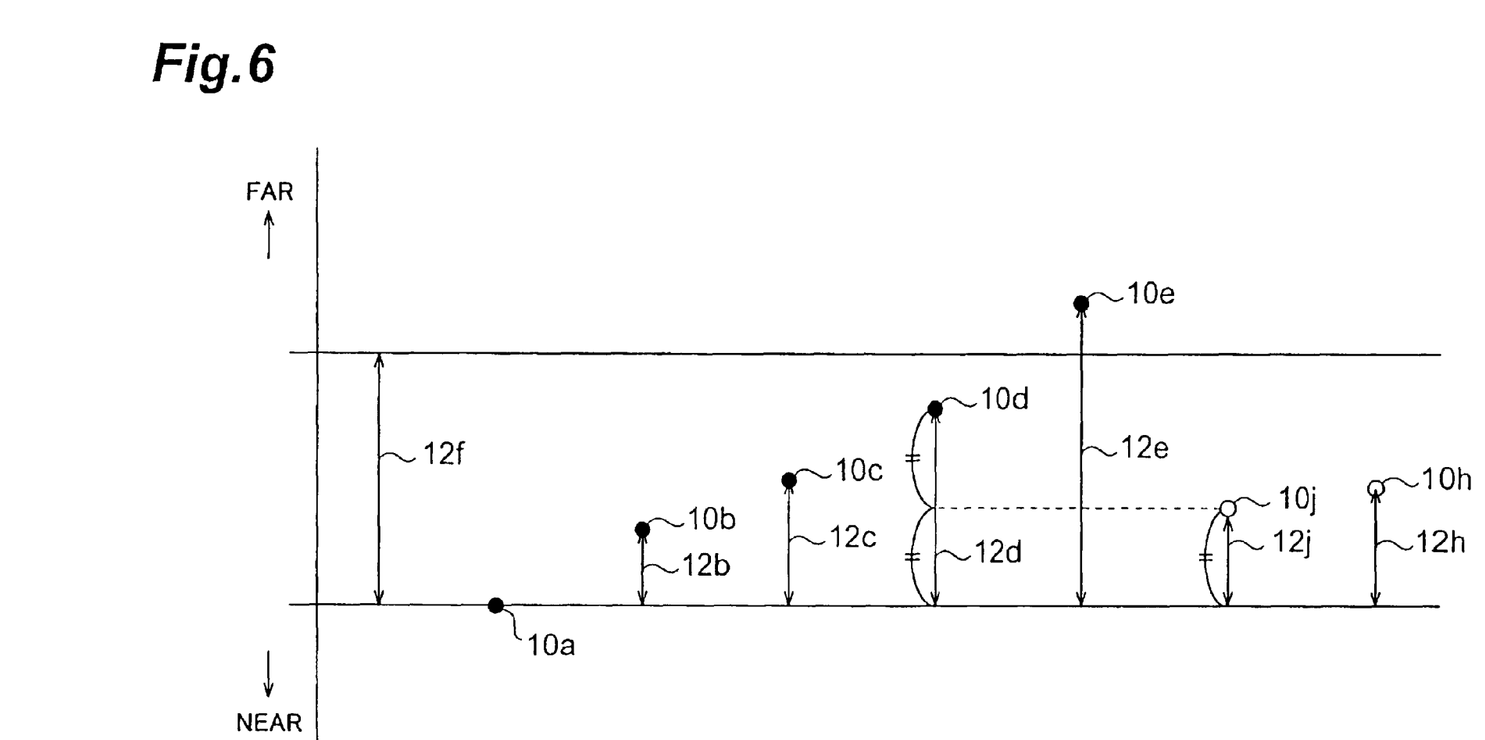
FIG. 6 is a schematic view depicting the positional relationships of the distance measurement values obtained.

The process by which the CPU 60 calculates the auto focus data based on the distance measurement values after the distance measurement values are calculated is described below with reference to FIGS. 5 and 6. FIG. 5 is a flow chart showing procedures for the above-mentioned process. FIG. 6 is a schematic view depicting the positional relationships of the five distance measurement values, wherein distance measurement values nearer the top of FIG. 6 represent distance measurement values (distance measurement values with small numerical values) that correspond to distances that are far from the camera, and distance measurement values nearer the bottom represent distance measurement values (distance measurement values with large numerical values) that correspond to distances that are near the camera. Distance measurement values are greater for those distances that are nearer (a state wherein the object is near the camera), and are smaller for those distances that are farther (a state wherein the object is far from the camera). This example will be followed below when referring to the size of the distance measurement values. In the case of FIG. 6, the distance measurement values 10a, 10b, 10c, 10d, and 10e are described in the order beginning with distance measurement values having greater magnitude (the corresponding distances are shorter).

The shortest distance measurement value, which is the distance measurement value (the greatest) corresponding to the shortest distance among the five obtained distance measurement values 10a, 10b, 10c, 10d, and 10e, is first detected (S10). In this example, the distance measurement value 10a is detected as the shortest distance measurement value 10a.

The differences of the distance measurement values except for the shortest distance measurement value 10a from the shortest distance measurement value 10a (i.e. distance measurement values 12b, 12c, 12d, and 12e) are calculated. The distance measurement values whose differences are less than a predetermined threshold value 12f are selected, and distance measurement values other than these are not used in the processing described below (S12). Here, the threshold value 12f may be switched in accordance with a variety of conditions, and may be modified on the basis of the circle of confusion, which is determined by the film sensitivity, the F number of the photographic lens, the focal distance, and the like. In the present embodiment, the threshold value 12f is set to a position at which the circle of confusion δ is expressed as δ=0.09 mm when the focus is matched to the distance corresponding to the shortest distance measurement value. In this example, the distance measurement values 10b, 10c, and 10d are selected and the distance measurement value 10e is not used for the remainder of the process. In this step, in case none of distance measurement values differs from the shortest distance measurement value 10a by a value less than the predetermined threshold value 12f, the autofocus data is set to the shortest distance measurement value 10a, and the autofocus data calculation process is completed (S13).

The mean value of the differences 12b, 12c and 12d, which are the differences of the selected distance measurement values 10b, 10c and 10d from the shortest distance measurement value 10a, is calculated as the first correction value 12h. In other words, in this case $12h=(12b+12c+12d)/3$ (S14).

The farthest distance measurement value 10d, which is the distance measurement value (the smallest) corresponding to the farthest distance among the distance measurement values 10b, 10c, and 10d (selected in S12) that differ from the shortest distance measurement value 10a by a value less than the predetermined value 12f, is subsequently detected, and the second correction value 12j, which is ½ the difference 12d between the shortest distance measurement value 10a and the farthest distance measurement value 10d, is calculated (S16).

The second correction value 12j is then compared with the first correction value 12h, and the lesser of the two is chosen as the adopted correction value (not shown) (S18, S20, and S22). In the case the two are the same, either value may be chosen. The autofocus data is further calculated by subtracting for correction the adopted correction value (a positive value) from the shortest distance measurement value 10a (S24).

The determination of anomalous autofocus data may also be prevented by setting the autofocus data as the predetermined value in the case that the autofocus data (which is the result of the calculation) is less than a predetermined value, or by setting the adopted correction value as the predetermined value in the case that the calculation result of the adopted correction value exceeds the predetermined value.

After the autofocus data is calculated, the CPU 60 obtains the distance from the plane to be brought into focus on the basis of the autofocus data while taking temperature and other factors into consideration, and the plane brought into focus is modified by moving the zoom lens camera cone 13 with a motor drive to a position corresponding to the obtained distance.

The operation of the above-described distance measuring apparatus is described below with reference to a specific example of taking a photograph. The first example has a large quantity of background, and is an example of when the background and the main subject are not substantially separated (Refer to FIG. 7). The person c (which is the main subject) is the shortest distance, and the background is entirely within the range of the threshold value.

Figure 7:
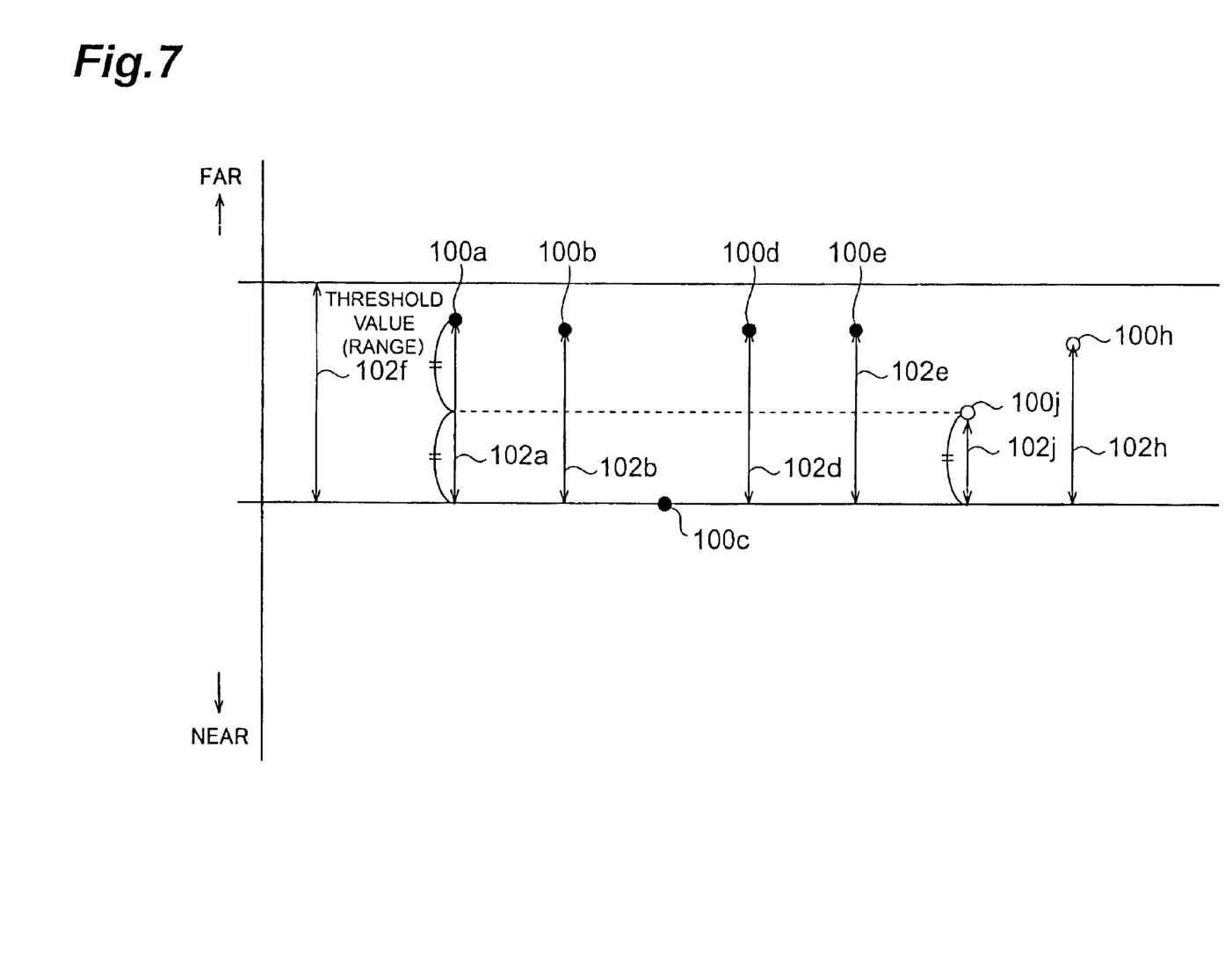
FIG. 7 is a schematic view depicting the positional relationships of the distance measurement values obtained.

Here, when the distance measurement values of the points a, b, c, d, and e are respectively set to 100a=4, 100b=6, 100c=40, 100d=6, and 100e=6, the threshold value 102f is set to 102f=51, and the distance measurement value of the shortest distance is 100c, the difference between 100c and the remaining distance measurement values are respectively $102a=100c-100a=36$, $102b=100c-100b=34$, $102d=100c-100d=34$, and $102e=100c-100e=34$. The mean value 102h of these is $102h=(102a+102b+102c+102e)/4=34.5$.

On the other hand, because the distance measurement value of the farthest distance is 100a, 102j is determined as $102j=102a/2=18$ (which is ½ the difference with the shortest distance).

Because $102h>102j$, $102j=18$ is therefore adopted as the correction value, the final distance measurement value is $100c-102j=40-18=22$, and the result of setting this autofocus data is that the plane to be brought into focus is set to a position between the person and the background. The distance measurement value is therefore prevented from being excessively corrected due to the effect of the background or the like, and a target plane to be brought into focus preferable for both the person and the background can be obtained.

Figure 8:
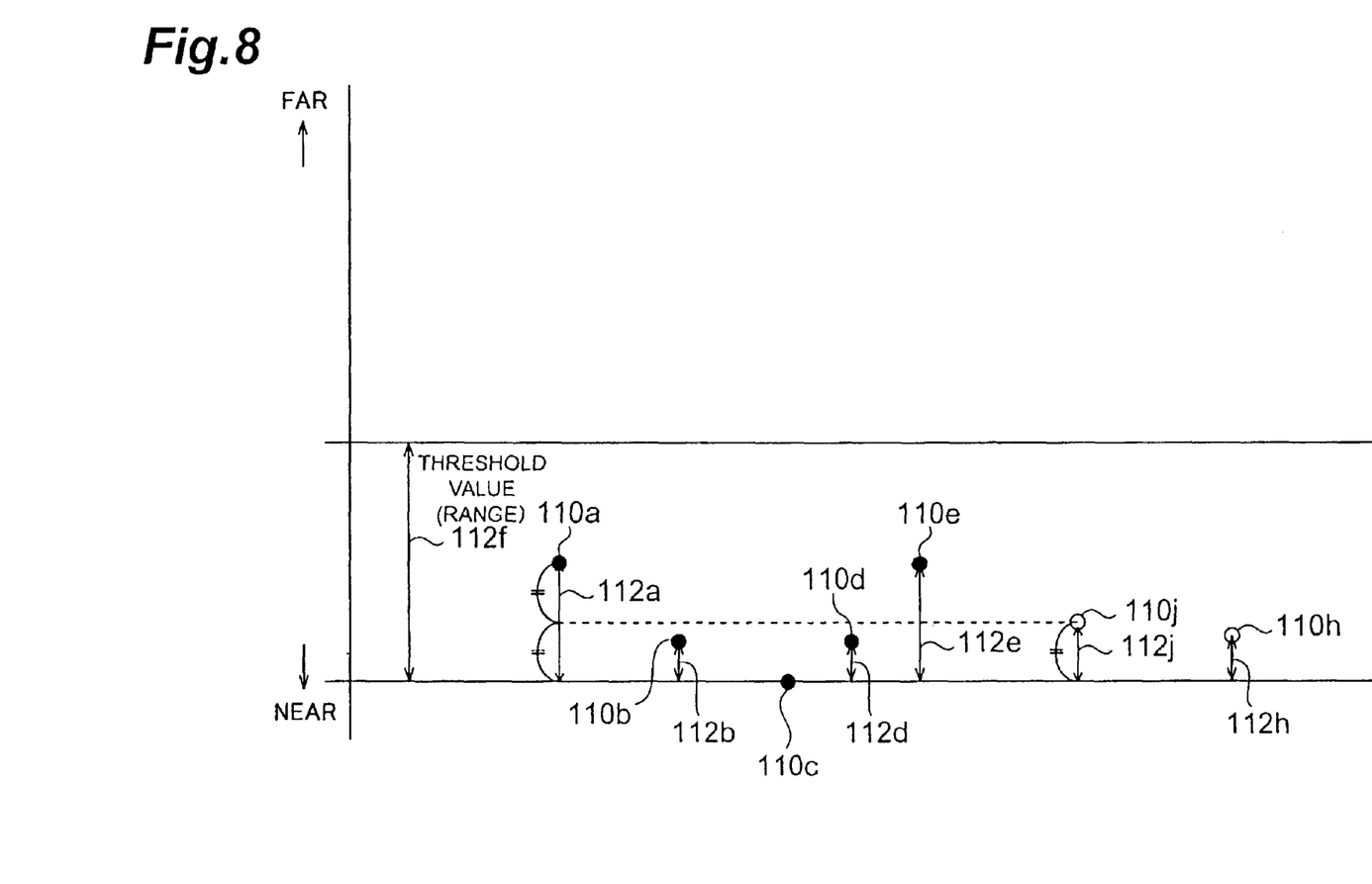
FIG. 8 is a schematic view depicting the positional relationships of the distance measurement values obtained.

The second example is an example of when a plurality of distance measurement values exists in a range proximate to the shortest distance (refer to FIG. 8). This applies to cases in which the faces of people are photographed at a short distance. In this case, the nose c is the shortest distance, and the ear a, cheek b, cheek d, and ear e are all within the range of the threshold value distance.

Here, when the distance measurement values of the points a, b, c, d, and e are respectively set to 110*a*=500, 110*b*=536, 110*c*=540, 110*d*=536, and 110*e*=520, the threshold value 112*f* is set to 112*f*=51, and the distance measurement value of the shortest distance is 110*c*, the differences between 110*c* and the remaining distance measurement values are respectively, 112*a*=110*c*−110*a*=40, 112*b*=110*c*−110*b*=4, 112*d*=110*c*−110*d*=4, and 112*e*=110*c*−110*e*=20. The mean value 112*h* of these is 112*h*=(112*a*+112*b*+112*c*+112*e*)/4=17.

On the other hand, because the distance measurement value of the farthest distance is 110*a*, 112*j* is 112*j*=112*a*/2=20 (which is ½ the difference with the shortest distance).

Because 112*h*<112*j*, 112*h*=17 is therefore adopted as the correction value, the final distance measurement value is 110*c*−112*h*=540−17=523, and the result of setting this autofocus data is that a target plane to be brought into focus preferable for the faces of people and other objects can be obtained, instead of setting the target plane at the shortest distance, when correction is required.

Figure 9A:
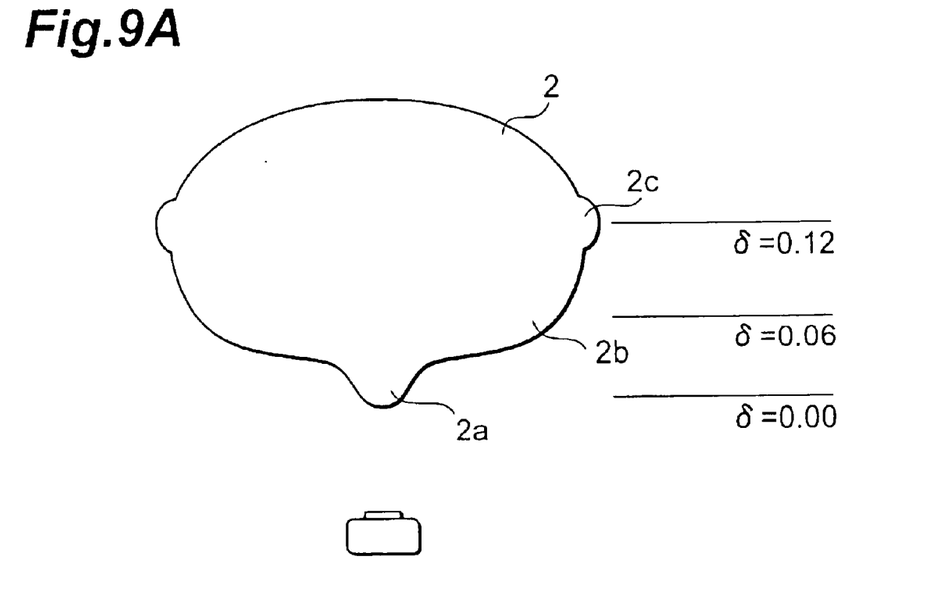
FIG. 9A is a schematic view in which the face of a person 2 is photographed with a conventional camera from a short distance.
Figure 9B:
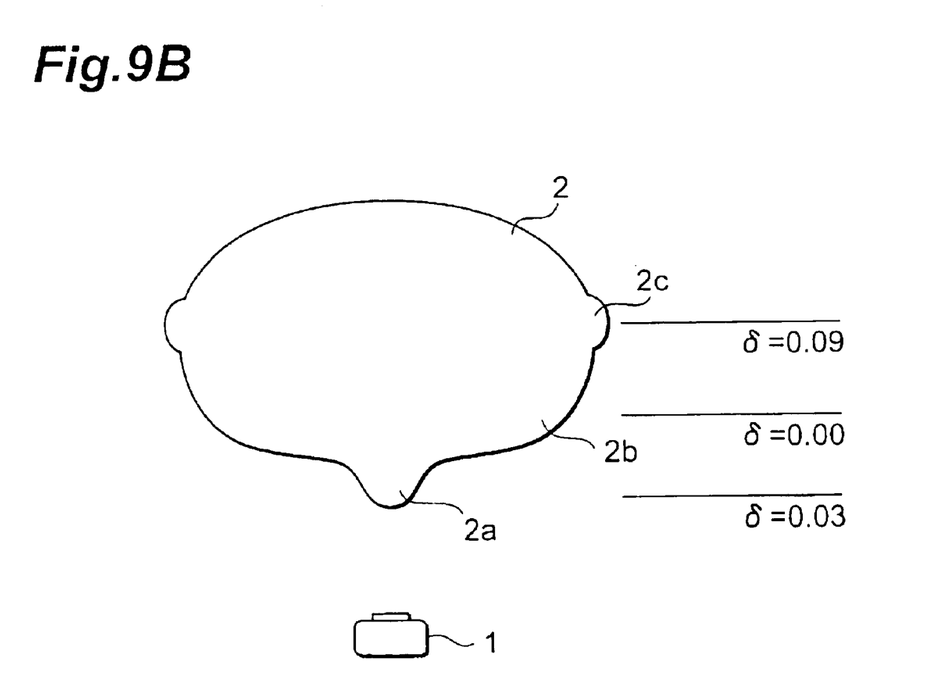
FIG. 9B is a schematic view in which the face of a person is photographed with a camera from a short distance.

This example is further described using FIGS. 9A and 9B. FIGS. 9A and 9B are schematic views in which a face of a person 2 is photographed with a camera from a short distance, and which are views seen from above the face of the person 2 and the camera. The case of a conventional camera is depicted in FIG. 9A, and that of the camera 1 of the present embodiment is depicted in FIG. 9B.

In a conventional camera, when the face of a person is photographed at a short distance, the plane to be brought into focus matches the position of the nose 2*a* of the person (δ=0.00 mm), which corresponds to the shortest distance measurement value. In other words, although the plane to be brought into focus matches the nose, the focal point of the ear 2*c* is blurred because the circle of confusion δ is great (δ=0.12 mm) at the position of the ear 2*c* of a person (which is the rearward portion of the face).

However, in the camera 1 of the present embodiment, because the shortest distance measurement value is corrected by the first correction value or the second correction value as described above, the plane to be brought into focus (δ=0.00 mm) matches the position of the cheek (2*b*) of the person. Because the position of the nose is δ=0.03 mm, the position of the ear is δ=0.09 mm, and the circle of confusion is comparatively reduced for both, an excellent focusing can be achieved over a broad range from the nose to the ear.

Figure 10:
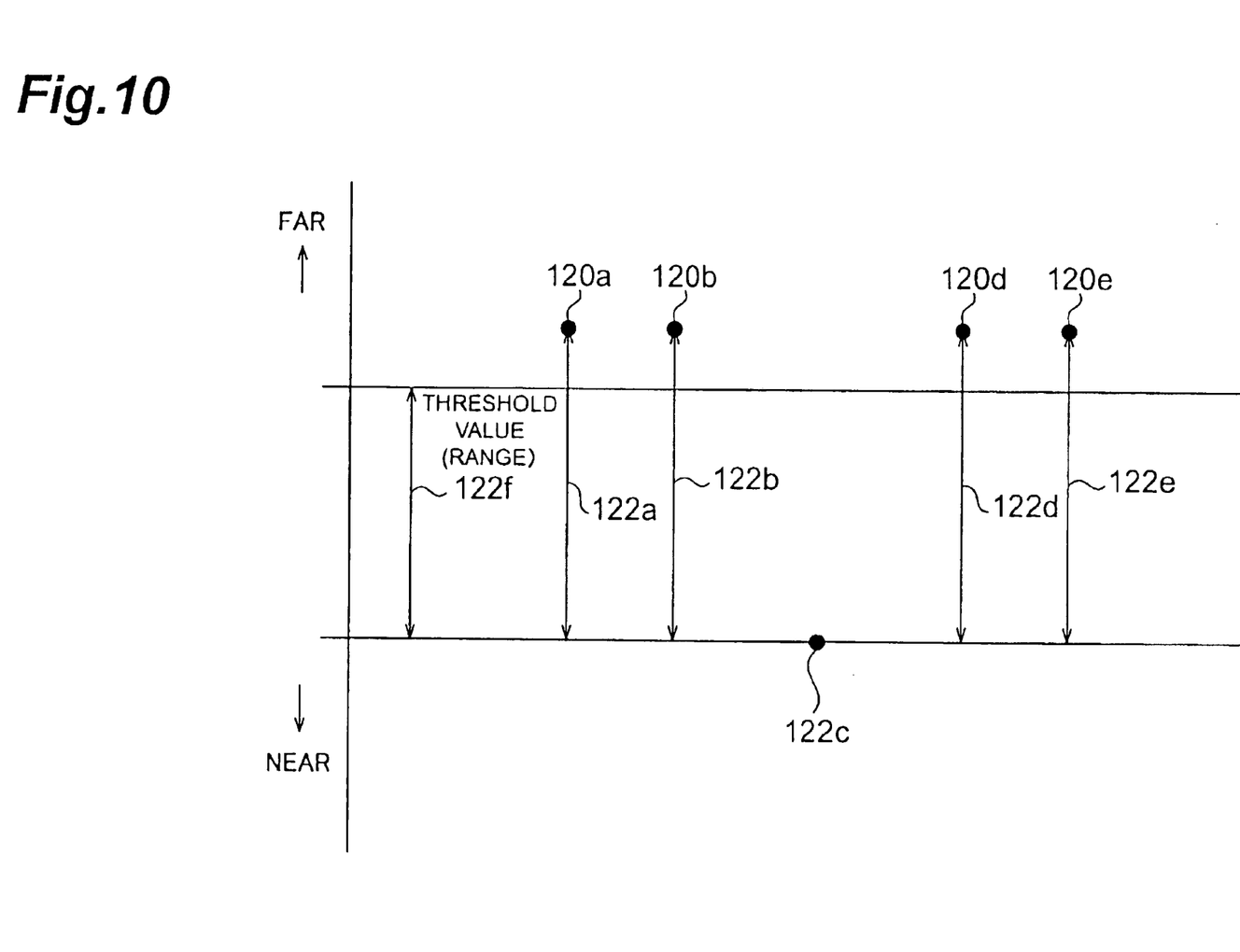
FIG. 10 is a schematic view depicting the positional relationships of the distance measurement values obtained.

The third example is an example of when the background is separated from the main subject (refer to FIG. 10). The person c constituting the main subject is the shortest distance, and the background is entirely outside the range of the threshold value distance.

Here, when the distance measurement values of the points a, b, c, d, and e are respectively set to 120*a*=5, 120*b*=5, 120*c*=80, 120*d*=5, and 120*e*=5, the threshold value 122*f* is set to 122*f*=51, and the distance measurement value of the shortest distance is 120*c*, the difference between 120*c* and the remaining distance measurement values are respectively, 122*a*=120*c*−120*a*=75, 122*b*=120*c*−120*b*=75, 122*d*=120*c*−120*d*=75, and 122*e*=120*c*−120*e*=75; and because the background is entirely outside the range of the threshold value distance, these values are not adopted, and the distance measurement value 120*c* of the nearest distance is ultimately calculated as the final distance measurement value. The result of setting this autofocus data is that the shortest distance value is selected, and the plane to be brought into focus matches the person without excessive correction.

According to the distance measuring apparatus described above, processing is performed as described below without simply adopting the shortest distance measurement value, or simply adopting the mean value of the distance measurement values, or switching between the mean value of the distance measurement values and the shortest distance measurement value on the basis of the results of the shortest distance measuring distance.

Specifically, distance measurement values within a predetermined range from the shortest distance are selected and, based on whether points of the selected distance measurement values are (1) biased to the nearest side or (2) biased to the farthest side in the predetermined range from the shortest distance, either (1) the mean value of the difference of the selected distance measurement values from the shortest distance measurement value, or (2) ½ of the difference between the shortest distance measurement value and the farthest distance measurement value among the selected distance measurement values is chosen as the adopted correction value, and the shortest distance measurement value is corrected by means of the adopted correction value toward the far side to calculate autofocus data. Therefore, autofocus data can be calculated in an appropriate manner without the autofocus data being excessively corrected on the basis of the shortest distance measurement value, or being set to the shortest distance when correction is required.

According to the camera that uses the above-mentioned distance measuring apparatus, because only the distance measurement values within the range of the predetermined threshold value from the short distance are used in the calculation of the autofocus data, and irregular distance measurement values outside of the predetermined threshold value are ignored, the autofocus data can further be appropriately determined without the autofocus data being excessively corrected from the shortest distance. By switching the above-mentioned predetermined value in accordance with a variety of conditions, it is possible to set the desired plane to be brought into focus such that entire picture field ranging from the farthest distance to the shortest distance is appropriately focused.

According to the camera that uses the above-mentioned distance measuring apparatus, because only distance measurement values in which the circles of confusion (when the plane to be brought into focus is set at the shortest distance) are used in the calculation of the autofocus data, all of the selected distance measurement values would be within the acceptable range of the circle of confusion even when the autofocus data is to be maximally corrected. Thus, it is possible to set the desired plane to be brought into focus such that the circles of confusion formed by both the shortest point and the farthest point are within favorable range.

Various alternative embodiments are conceivable in the present invention. In the embodiments described above, CPU 60 generates the autofocus data by processing the sensor data. However, there is not a limitation that the generating action take place in the CPU 60. It is possible that the autofocus data is generated by processing the sensor data in the AF sensor 74, and then the generated autofocus data is provided to the CPU 60.

In the embodiments described above, the present invention was applied to a passive AF camera, but as long as the autofocus data is calculated on the basis of a plurality of distance measurement values, application may be appropriately made to active AF, TTL, hybrid AF, and contrast AF cameras. It is also possible to make appropriate application to silver bromide cameras, electronic still cameras, video cameras, and other types of cameras.

According to the present invention, it is possible to provide a distance measuring apparatus capable of calculating autofocus data so that favorable plane to be brought into focus can be obtained based on a plurality of distance measuring data.

What is claimed is:

1. A distance measuring apparatus having a plurality of distance measuring regions, for calculating autofocus data based on a plurality of distance measurement values acquired in the plurality of distance measuring regions, said distance measuring apparatus comprising:

distance measurement value selecting means for detecting a shortest distance measurement value corresponding to a shortest distance among the plurality of distance measurement values, and selecting the distance measurement values that differ from the shortest distance measurement value by a value less than a threshold value;

first computing means for calculating as a first correction value the mean value of difference values between the shortest distance measurement value and the distance measurement values selected;

second computing means for detecting a longest distance measurement value corresponding to a longest distance among the distance measurement values selected, and calculating as a second correction value ½ of the difference between the shortest distance measurement value and the longest distance measurement value; and third computing means for calculating the autofocus data by correcting the shortest distance measurement value, using the first correction value as a correction value if the second correction value is larger than the first correction value, and using the second correction value as the correction value if the second correction value is less than the first correction value.

2. The distance measuring apparatus according to claim 1, wherein the threshold value is variable.

3. A camera comprising the distance measuring apparatus according to claim 2, wherein the threshold value is based on a circle of confusion.

* * * * *